March 2, 1954   T. H. McC. HOPKINS ET AL   2,670,556
BAITING MACHINE

Filed July 25, 1949   8 Sheets-Sheet 1

Inventor
T.H.McC.Hopkins
G.Bauernfeind
By
Attorneys

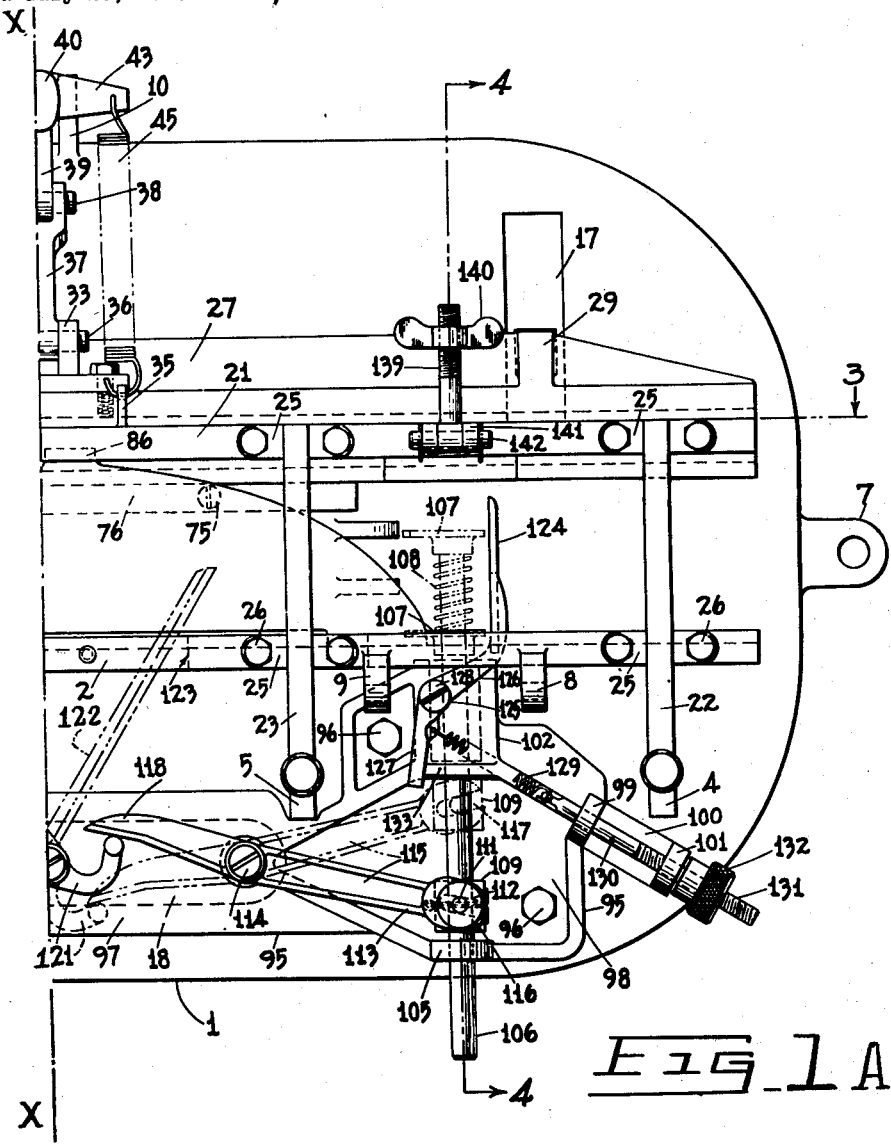

March 2, 1954    T. H. McC. HOPKINS ET AL    2,670,556
BAITING MACHINE
Filed July 25, 1949      8 Sheets-Sheet 3
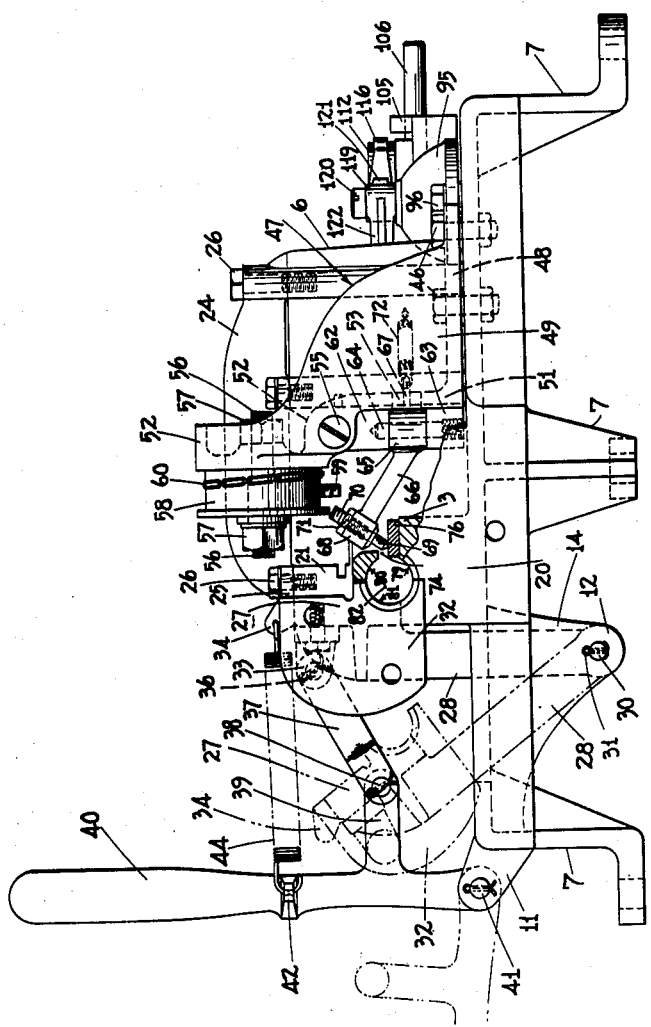
Inventors
T.H.Mc.C.Hopkins
G.Bauernfeind

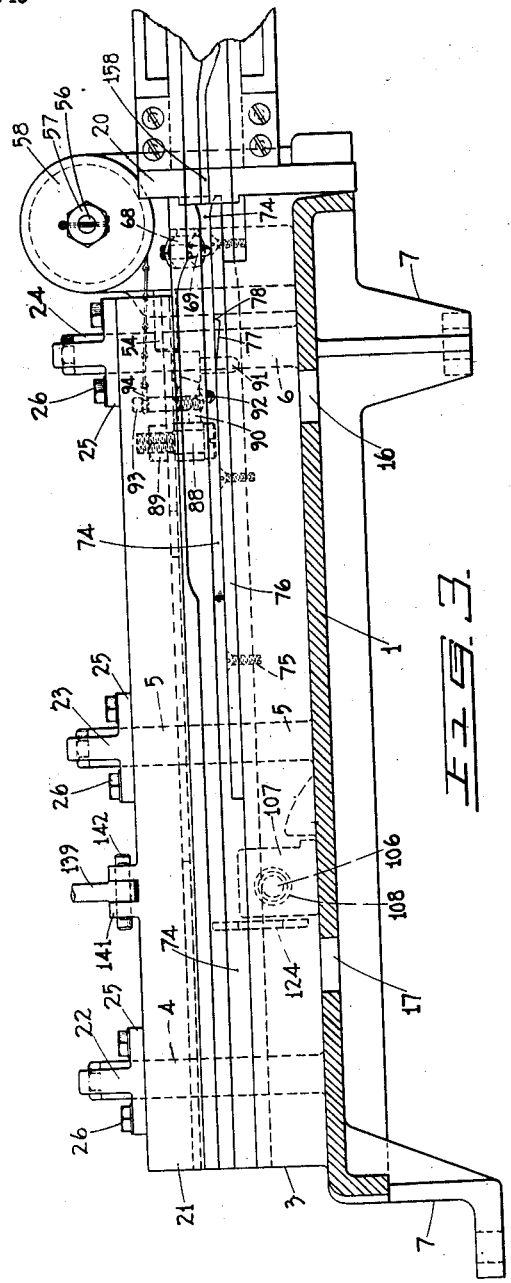

March 2, 1954  T. H. McC. HOPKINS ET AL  2,670,556
BAITING MACHINE

Filed July 25, 1949  8 Sheets-Sheet 5

Inventors
T. H. Mc. C. Hopkins
G. Bauernfeind
By Glascock Downing Seebold
Attys.

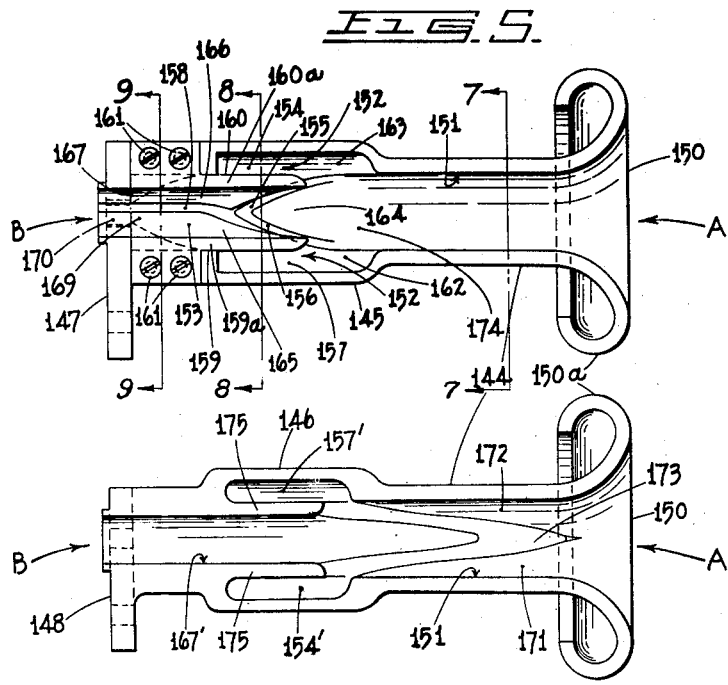
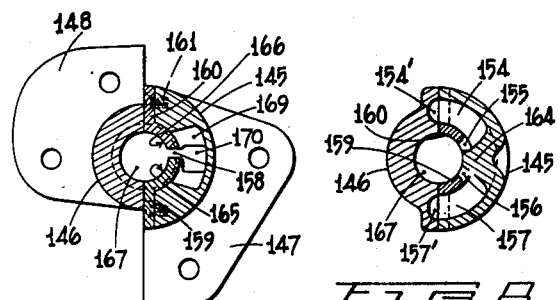

March 2, 1954 T. H. McC. HOPKINS ET AL 2,670,556
BAITING MACHINE
Filed July 25, 1949 8 Sheets-Sheet 7

Inventors
T.H.Mc.C.Hopkins
G. Bauernfeind
By Glascock Downing Diebold
Attys.

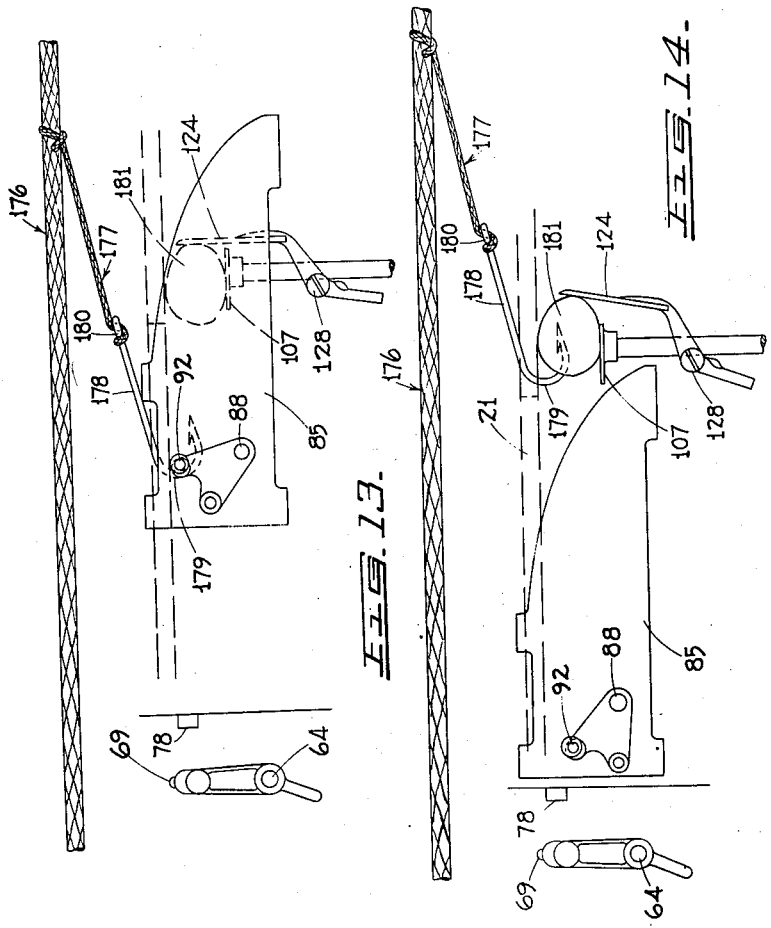

Patented Mar. 2, 1954

2,670,556

UNITED STATES PATENT OFFICE 2,670,556

BAITING MACHINE

Thomas Henderson McCully Hopkins, Sea Island, Vancouver, and George Bauernfeind, Richmond, Vancouver, Canada, assignors to Andhop Patents Limited, Victoria, British Columbia, Canada, a corporation of British Columbia Application July 25, 1949, Serial No. 106,714

13 Claims. (Cl. 43—4)

The present invention relates to baiting machines and in particular to automatic baiting machines.

It is an object of the present invention to provide an improved baiting machine that will automatically bait fishing lines of ten thousand feet or more in length having secured thereto at intervals two thousand or more hooks.

A further object of the invention is the providing of a baiting machine that will automatically cut pieces of bait of the required length to be impaled on hooks moving through the machine.

A further object of the present invention is the eliminating of the hazardous manual operations previously necessary in the cutting-up of bait and the placing of it on the hooks.

Additional objects will be apparent from the description to be given below.

The invention consists in the constructions, combination and arrangement of parts hereinafter described and more particularly pointed out in the appended claims.

One convenient embodiment of the invention will now be described by way of example with reference to the drawings in which:

Figures 1 and 1A are a composite plan view of the baiting machine, Figure 1A illustrating the details of construction to the right of and in continuation of the structure shown in Figure 1;

Figure 2 is a section along the line 2—2 in Figure 1;

Figure 3 is a section along the line 3—3 in Figures 1 and 1A;

Figures 5 and 6 are side elevations of the inside of the nozzle;

Figure 7:
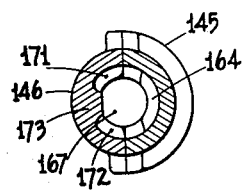
Figure 10:
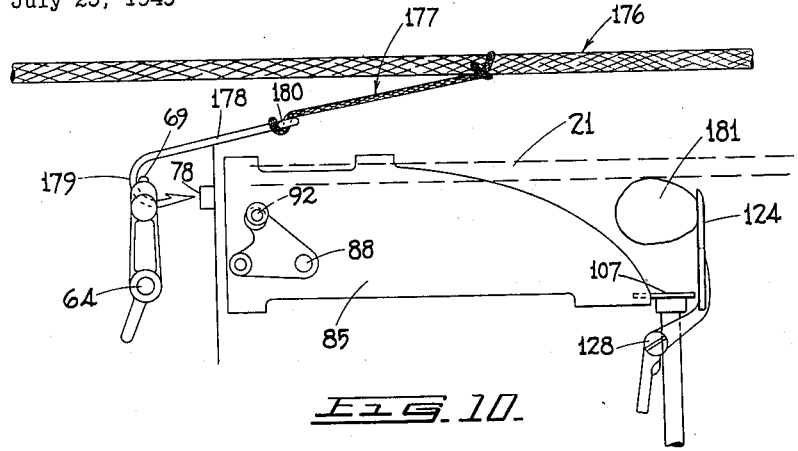
Figure 11:
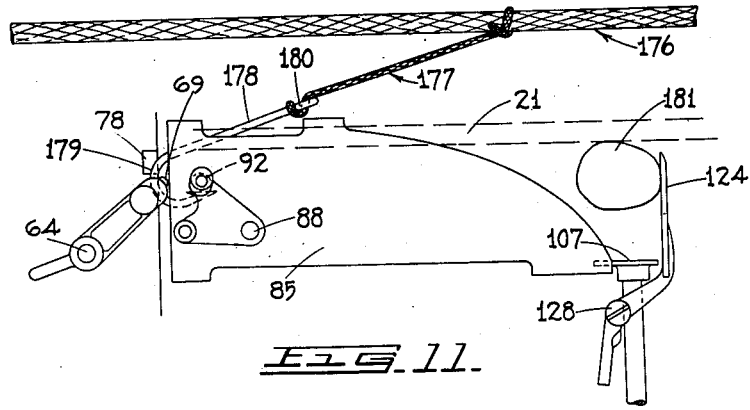
Figure 12:
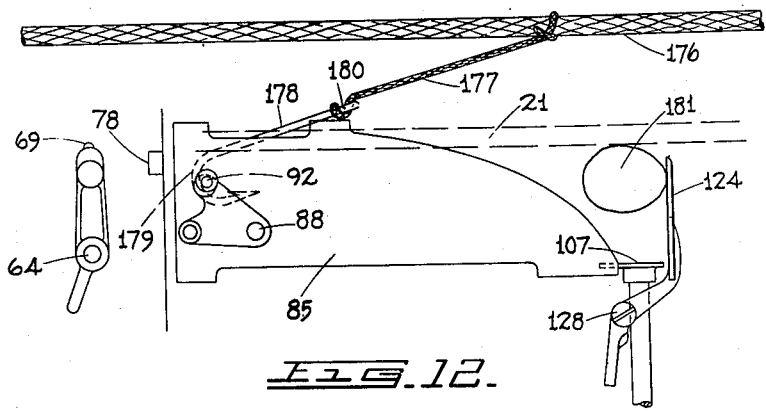

Figures 7, 8 and 9 are transverse sections of the nozzle along the lines 7—7, 8—8 and 9—9 respectively in Figures 5 and 6 with the two parts of the nozzle fitted together.

Figures 10, 11, 12, 13 and 14 are a series of diagrammatic plan views, with all but necessary detail omitted, of the baiting operation.

Figure 4:
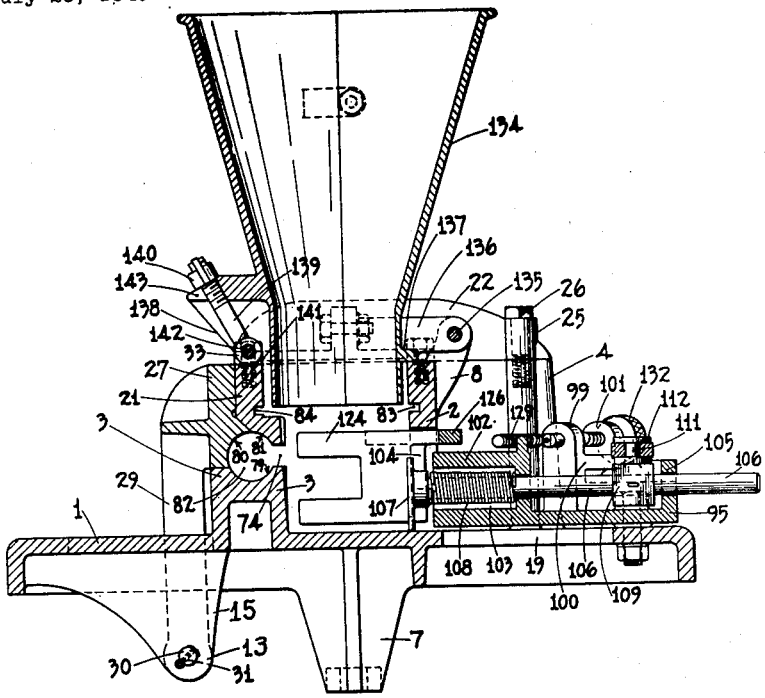
Figure 4 is a section along the line 4—4 in Figure 1A showing the hopper in position.

The machine comprises a metal base section 1 which is formed with longitudinal metal bars 2 and 3, buttresses 4, 5 and 6, feet 7, and brackets 8, 9, 10, 11, 12, 13, 14 and 15, see Figure 4 for brackets 14 and 15. If desired the parts 2 to 15 and the base 1 may be cast in one piece. The base 1 is provided with apertures 16, 17, 18 and 19. Integral with bar 3 is an upwardly extending flange 20 and welded or otherwise secured to the flange 20 is a narrow longitudinal bar 21 which is superposed on and separate from bar 3. The bar 21 is supported by transverse braces or bridging elements 22, 23, 24, having lugs 25 formed with holes through which pass bolts 26; the brace 22 being secured by bolts 26 to longitudinal bar 2 and buttress 4; the brace 23 to bar 2 and buttress 5 and the brace 24 to bar 2 and buttress 6.

Removably pressed against the bar 21 is a movable bar 27, and extending downwardly from the bar 27 are arms 28 and 29 which extend respectively through apertures 16 and 17 and are respectively pivotally secured to brackets 12 and 13 and 14 and 15 by means of pins 30 and 31. The bar 27 is provided with a flange 32, and brackets 33, 34 and 35. Pivotally secured to the bracket 33 by means of a pin 36 is a short link 37 which is pivotally secured by means of a pin 38 to an arm 39 projecting laterally from a handle 40, one end of which is pivotally secured to the brackets 10 and 11 by means of a pin 41. The handle 40 is provided with lateral projections 42 and 43 to which are respectively secured tension springs 44 and 45. The spring 44 is in turn secured to the bracket 34 and the spring 45 to the bracket 35. Due to the foregoing disposition of parts the bar 27 may be moved into or out of engagement with the bar 21 and is held yieldingly in the engaging position by the springs 44 and 45, as indicated in full lines in Figure 2.

Secured to the base 1 by means of bolts 46 is a bracket or support 47 comprising a bottom section 48, side-walls 49 and 50 and front wall 51. See Figures 1 and 2. The upper portion 52 of the front wall 51 is somewhat thickened and extends laterally of the lower portion. A shoulder on the upper portion 52 of the wall 51 is integral with the side walls 49 and 50. The lower portion of the wall 51 has an aperture 53. The upper thickened portion 52 of the front wall 51 serves as a housing for a compression spring, not shown, and one end of a buffer pin 54 (Figure 1), the pin 54 being in the same plane as the blade 35 to be later described. The spring 54 is held in place and under compression by means of a screw 55 (Figure 2).

Secured to the top of the front wall portion 51 of the bracket 47 by means of a bolt 56 and nuts 57 is a hollow pulley 58 having a pin 59 extending therefrom. To the pin 59 one end of a short length of a flexible element such as a chain 60 is secured and to the opposite end of the chain 60 is attached a small ring 61 or other suitable connecting means. The pulley 58 serves as a housing for a coil spring, not shown. The spring may be secured to the bolt 56 and the interior of the pulley 58, the container being free to rotate in either a clockwise or a counterclockwise direction on the bolt 56.

The lower portion of the front wall 51 of the bracket 47 has extending outwardly therefrom and preferably cast integral therewith a pair of spaced lugs 62 and 63. Rotatably secured between the lugs 62 and 63 by means of a bolt 64 is a boss 65 having two arms 66 and 67, the arm 66 extending angularly from the boss in an upward direction (see Figure 2). The free end of the arm 66 carries a second boss 68 equipped with a pointed pin 69 having a threaded upper end 70 secured in the boss 68 by a nut 71. The pointed end of the pin 69 extends downwardly at an angle from the boss 68 and its effective length may be adjusted within the limits of the threaded end 70. The arm 67 on the boss 65 extends through the aperture 53. One end of a tension spring 72 is fastened to the free end of the arm 67, the opposite end of the spring being secured to the side wall 50 of the bracket 47 (see Figures 1 and 2).

The flange 26 which is unitary with the longitudinal bars 3 and 21, has an aperture which communicates with a narrow passage 74 which extends for the full length of the machine and is defined by the lower edge of the superposed bar 21 and a longitudinal portion of the upper edge of the bar 3. Secured by screws 75 to the upper edge of the bar 3 is a metal plate 76. The plate 76 extends over a portion of the length only of the bar 3 and a section of the plate is cut away to form a sloped portion 77 terminating in a shoulder 78 (see Figures 1 and 3).

The bars 3, 21 and 27 are provided with arcuate channels or troughs 79, 80 and 81 respectively (see Figures 2 and 4) and when the bar 27 is in engaging relationship with the bar 21 the three channels together form or define a passage 82 substantially circular in cross section, which extends for the full length of the machine and communicates with the passage 74.

Each of the bars 2 and 21 is provided with a longitudinal groove, the groove in bar 2 being shown at 83 and that in the bar 21 at 84 (see Figure 4). The two grooves face one another and are in the same horizontal plane and serve to support and guide a blade 85 which is adapted to traverse approximately the full length of the machine. The blade 85 has a curved cutting-edge at one side terminating in a blunt point and is retained in the slots 83 and 84 by means of lateral projections 86. Adjacent its butt-end the blade is formed with an aperture 87 preferably of the shape shown in Figure 1. Pivotally secured by means of a bolt 88 and a nut 89 to the underside of the blade at a point close to the aperture 87 is a V-shaped member 90 having a pin 91 secured to the one arm and a pin 92 secured to the other. The pin 91 extends vertically downward from the bracket and the pin 92 projects downwardly at a slight angle to the vertical (see Figure 3). A third pin 93 is secured to and extends upwardly from the member 90 and through the aperture 87. The pin 93 is formed with a peripheral groove 94 at its upper end with which the ring 61 on the chain 60 engages (see Figures 3 and 4).

A bracket 95 is secured to the base 1 above apertures 18 and 19 by means of bolts 96. One end 97 of the bracket is approximately semi-circular in cross-section and is elevated slightly above the opposite end 98 of the bracket. The end 97 of the bracket lies between the planes of the buttress members 6 and 5 while the end 98 of the bracket lies between the planes of the buttress members 4 and 5. Secured to the end 98 of the bracket 95 is a short vertical bearing 99 having secured thereto a short horizontal arm 100 to which is attached another short, vertical bearing 101, in alignment with the bearing 99. Preferably the parts 99, 100 and 101 are cast in one piece with the bracket 95. Integral with the end 98 of the bracket 95 is a bearing 102 extending to the outside edge of the bar 2, the inner end of the bearing being provided with a recess 103 facing an opening 104 in the bar 2 (see Figure 4). Slidably mounted in the bearing 102 and in a bearing 105 formed on the outer edge of the bracket 95 is a rod 106 having a plate 107 secured to its inner end. The rod 106 makes a reciprocatory motion at right angles to the long axis of the base 1 whereby the plunger plate 107 also makes a reciprocatory motion across or at right angles to a longitudinal space defined between the bars 2 and 3. In making that motion the plunger plate 107 is extended on the rod 106 from the end of the recess 103 of the bearing 102 through the opening 104 in the bar 2 and toward the bar 3. The movement of the plunger plate 107 is effected by means of a compression spring 108 which is mounted on the plunger-rod 106 and confined between the plunger-plate 107 and the inner end of the bearing 102 (see Figure 4). The distance that the plunger 107 may extend is determined by a collar 109 which is secured to the plunger-rod 106 at a suitable point (see Figure 4). The collar is so positioned that it may abut the outer end 110 of the bearing 102 and thereby arrest the movement of the plunger when it is extended by the spring 108 to the desired position.

Extending upwardly from the collar 109 is a short pin 111 provided with an enlarged head 112. The pin 111 is engaged by the end of a lever 113 which is pivotally mounted on a bolt 114 on the end 97 of the bracket 95. The end 115 of the lever 113 is forked as at 116 to provide an open-ended slot 117. The fork 116 embraces the pin 111 on the collar 109 and enables the end 115 of the lever 113 to reciprocate slightly on the pin 111 within the slot 117 when the lever 113 is rocked. The opposite end 118 of the arm 113 is unattached.

Figure 1:
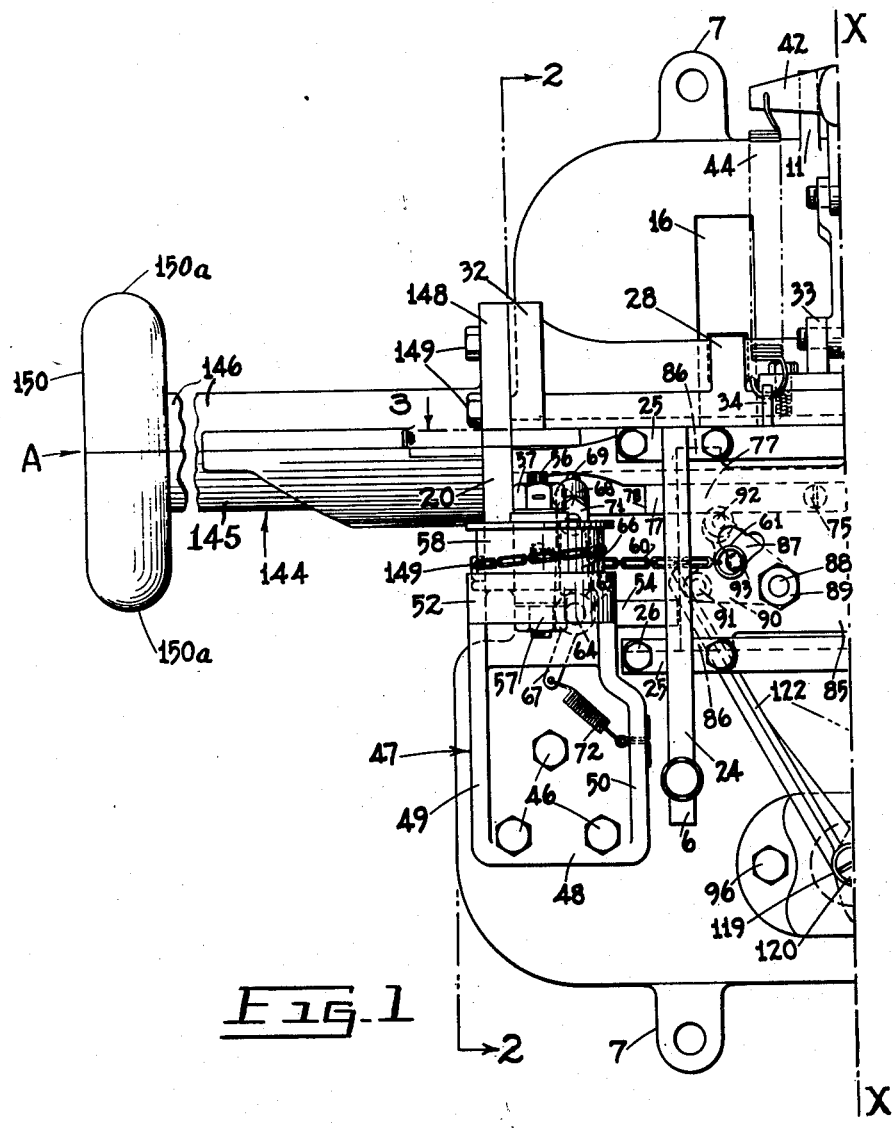

A second lever 119 is also pivoted on the end 97 of the bracket 95. The pivotal point of the second arm is in alignment with but remote from the pivotal point 114 of the arm 113. The second lever 119 is pivoted on a bolt 120 and lies in the same horizontal plane as but is angularly disposed to the arm 113. One end 121 of the lever 119 is relatively short and is in constant sliding contact with the free end 118 of the lever 113 (Figure 1). The opposite end 122 of the lever 119 is unattached and is considerably longer than the end 121. The arm 122 of the lever 119 extends through an opening 123 in the bar 2 and extends in the direction of the bar 3 and beneath the blade 85 and immediately behind the pin 91 and is so positioned that in pivoting it describes an arc within the above-mentioned space defined between the bars 2 and 3 but within an area removed from the point at which the plunger-plate 107 reciprocates across the said space. The pressure of the spring 108 keeps the arm 122 constantly in contact with the pin 91.

Movably situated and serving as a yieldable obstruction within the longitudinal space between the bars 2 and 3 is a small door or flap 124 secured to a small angular lever 125 extending from the door 124 through the opening 104 in the bar 2 (Figure 4) and above and across the bearing 102. The bar 125 comprises angularly-disposed arms 126 and 127 which are pivotally secured to the top of the bearing 102 on a bolt 128 at their point of juncture. The arm 127 has secured thereto one end of a tension spring 129, the other end of which is secured to a rod 130 one end 131 of which is threaded. The rod 130 passes through aligned holes in and is slidably secured in the bearings 99 and 101 and is held therein by a nut 132 on the threaded end 131 of the rod. By turning the nut 132 the tension of the spring 129 can be adjusted. The normal position of the door 124 is determined by a stop 133 against which the arm 127 normally rests.

A conical hopper 134 (Figure 4) is tiltably secured to the bar 2 by means of a rod 135 which passes through the brackets 8 and 9 and a pair of aligned lugs 136 on the hopper. The hopper is supported by the lugs 136 and by a projecting shoulder 137, at the base 138 of the hopper, which rest on the upper edges of the bars 2 and 21. When in upright position as shown in Figure 4 the hopper is secured against tilting or displacement by means of a bolt 139 and a wing-nut 140, the bolt 139 being pivotally secured to a bracket 141 on the bar 21 by means of a pin 142, said bolt being engageable with a slot 143 in the base 138 of the hopper and being securable therein by the wing-bolt 140. The hopper is situated immediately above the line of traverse of the plunger-plate 107 and between the transverse braces 22 and 23 and its lower end extends into the space lying between the bars 2 and 3. The lower edge of the hopper lies in the same plane as the upper surfaces of the knife-guiding grooves 83 and 84 in the bars 2 and 21 respectively (Figure 4).

A hollow nozzle indicated generally at 144 is divided longitudinally into two parts 145 and 146. The part 145 is provided with a flange 147 at the exit end of the nozzle indicated generally at B. The movable part 146 has a flange 148 which may be secured by bolts or studs 149 to the flange 32 on the movable bar 27. The part 145 is stationary and may be secured by bolts 149 passing through flange 147 to the flange 20 on the bars 3 and 21. The entrance end of the nozzle indicated generally at A is in the form of a bell-mouth 150 the edges of which are rolled back on themselves forming a well-rounded lip 150a. The function of the nozzle is to guide the line and hooks through the baiting machine and to position the hooks so that they may automatically leave the nozzle and enter the machine proper in a baitable position. To that end the nozzle comprises a line- and hook-guiding channel 151 which is unitary with an enlarged annular chamber or outer channel 152 formed adjacent the exit end B of the nozzle.

The chamber or depression 152 is divided into a line-guiding channel 153 and a series of hook-guiding channels 154, 155, 156, 157 and 158, the division being accomplished by a pair of septum-like plates 159 and 160 secured to a thickened portion of the wall of the part 145 by means of screws 161. The chamber or depression 152 is divided over a portion of its length into two branches 162 and 163, the one sloping upwardly and the other downwardly, by means of wedge-shaped section or frog 164 formed in the wall of the part 145. The plates 159 and 160 comprise channeled portions 165 and 166 arc-shaped in cross-section, their curvature being concentric with the curvature of the wall of the nozzle part 145. The inner edges of the channeled portions 165 and 166 lie parallel one to the other for a portion of their length and diverge, the one upwardly and the other downwardly, from a point adjacent the tip of the frog 164, the lines of divergence being parallel to the sides of the frog 164, each of the plates 159 and 160 terminating in a blunt point at the base of the frog. The outer edges 159a and 160a of the arc-shaped portions 165 and 166 of the plates 159 and 160 abut against complementary flat-surfaced ridges 175 in the nozzle-section 146 forming a circular line-guiding channel 167 which is an extension of but has a smaller diameter than the line- and hook-guiding channel 151. The channel 167 extends to the end B. The chamber or outer passage 152 is tapered at the exit end B of the nozzle, the end 169 of the tapered portion opening into a rectangular aperture 170 in the flange plate 147, the aperture 170 being adjacent the channel 167 and connected thereto by the hook-guiding channel 158.

The part 146 of the nozzle is the complement of the part 145 and accordingly comprises a hook- and line-guiding channel 151 having hook-positioning grooves 171 and 172, separated by a wedge-shaped ridge 173, which grooves lead respectively to grooves 154' and 157' which are shallow chambers or depressions in the nozzle-section 146 and are the respective complements of the channels 154 and 157 of the part 145. Continuous with the hook- and line-guiding channel 151 is shown a line-guiding channel 167' which is of course the complement of the line-guiding channel 167 shown in part 145.

Looking at the complete nozzle from the entrance A toward the exit B through the progressive sections indicated in Figures 7, 8 and 9 it will be seen that for about one-half of its length the nozzle comprises a single passage 151 more or less circular in cross-section. At a point adjacent the base of the wedge-shaped portion or frog 164 the single passage 151 branches into two separately defined but interconnected passages, one being an outer passage formed by the chamber 152 and defined between the wall of the part 145 and the plates 159 and 160; the other being the inner passage 167 which is as stated above, a continuation of the passage 151 and concentric with the outer passage and formed by the plates 159 and 160 and the semi-circular channel 167' in the nozzle section 146.

When the nozzle is secured to the machine the passages 151 and 167 are in alignment with the passage 82 (Figures 2 and 4) and the restricted end of the chamber or outer passage 152 and the rectangular aperture in the flange plate 147 are in alignment with the channel 74 in the flange 20. A circular flange 174 at the exit end B of the nozzle is in registration with and insertable into a corresponding groove formed at the periphery of the aperture 82 thus adding to the rigidity of the structure.

The description of the operation of the machine will now be given from a position facing the machine at the entrance end A of the nozzle. In the course of the description reference will be made to the main fishing line 176 having shorter lines 177 attached thereto. Secured to the shorter lines are hooks each comprising a shank 178, a barb 179, and an eye 180 to which the short line 177 is secured as indicated diagrammatically in Figures 10 to 14.

The main line 176 with the shorter lines and their hooks secured thereto at intervals may be wound around a windlass which may be secured to the boat, neither the windlass nor the boat being shown in the drawings.

The main line need not be threaded through the machine but may be laid therein when the line-guiding mechanism is in the open position as indicated by the dotted lines in Figure 2 showing the bar 27 out of engaging relation with the bars 3 and 21. The part 146 of the nozzle, being secured to the bar 27 and not secured to the part 145, may be swung outwardly with the bar 27 by means of the handle 40 against the action of the spring 44 and 45. The arrangement of the handle 40 and related parts is such that the bar 27 and nozzle part 146 will remain yieldingly in the open position automatically as long as desired.

When the line has been placed in the machine the line-guiding means 27 and hook-guiding mechanism 146 is closed. The free end of the line lying in the passages 151 and 167 in the nozzle and in the passage 82 in the machine proper, and being free of hooks for a portion of its length, is drawn through the machine for the required distance and secured to an anchored buoy, the line 176 is pulled through the machine and the baiting operation begins. In the meantime a supply of bait (indicated at 181 in Figures 10 to 14), such as a small fish or a strip of herring, is placed in the hopper 134, the lower end of the strip of bait resting on the floor of the base 1 and immediately in front of the door or flap 124.

As the first hook reaches the bell-mouth 150 of the nozzle it is drawn over the lip 150a and into the entrance end A. The diameter of the lip of the bell-mouth must be greater than the distance between the shank and the barb of the hook in order that the hook may slide unhampered into the nozzle, it being understood that the eye and shank precede the barb.

The diameter of the passage 151 is greater than the transverse distance between the barb and the shank of the hook but the diameter of the inner passage 167 is less than the distance between the barb and the shank. When the hook proceeds through the passage 151 with the barb lying to the right or in the nozzle part 145 the barb is deflected either upwardly or downwardly by the depression 174 and the barb-end, being unable to enter the passage 167, is pulled into either the channel 154 or the channel 157 being deflected into one or other of the two channels by the pointed ends of the plates 160 or 159; which as stated above abut against corresponding ridges 175 in the section 146 of the nozzle; into either the channel 155 or the channel 156, the barbed end moving either downwardly in the channel 155 or upwardly in the channel 156. The barb at this point moves forwardly in the outer passage 152 but the eye 180, a portion of the shank 178, the main line 176 and the shorter line 177 are confined to the inner passage 167. If the barbed end enters the channel 155 it will proceed into the channel 158 with the barb in a horizontal plane and facing right. If the barbed end enters the channel 156 the barb will be facing downwardly and will be turned on the diverging edge of the plate 159 through an angle of approximately 90° into channel 158 with the barb in horizontal position and facing right. In either case the hook will be pulled out of the nozzle with the barb facing right and in that position will enter the aperture 74 of the machine and grapple the pin 69 which obstructs the aperture 74 (see Figures 2 and 3).

When the hook proceeds through the passage 151 with the barb lying to the left or in the part 146 of the nozzle the barbed end is deflected by the ridge 173 and is turned either upwardly or downwardly through an angle of approximately 90° into either the channel 154 or the channel 157 and passes through and out of the nozzle as described above. It will therefore be seen that in no matter what position the hooks enter the nozzle they will automatically be moved into the desired position while passing through the nozzle.

The pin 69, which is grappled by the barbed end 179 of the hook as it enters the machine after leaving the nozzle (see Figure 10), is free to pivot on the pin 64, in an arc-shaped path across the end of the plate 76 and shoulder 78 therein (see Figures 1, 2 and 3). The vertical distance between the lower end of the pin 69 and the top of the plate is less than the thickness of the hook and the hook cannot free itself of the pin 69 until it has moved it across the shoulder 78 (Figures 1 and 3) at which point the barbed end of the hook is in alignment with the pin 92 carried by the member 90 on the blade 85 (see Figure 11). As the hook and the pin pass over the shoulder 78 the hook drops into the sloped depression 77, and the pin 69 is released and is returned to its original position by the spring 72 on the arm 67 (see Figure 12).

The barbed end of the hook meanwhile has grappled the pin 92 (see Figure 12) but the knife does not start to move until member 90 has rocked on its pivot so that pin 93 has travelled from the rear to the forward portion of slot 87. This movement causes pin 91 to move inwardly far enough to release lever 119 and allow the plunger plate 107 to come into contact with the bait before the blade has moved at all. The hook then commences to move the blade 85 through the machine in the direction of the hopper 134, against the action of the coiled spring in the pulley 58. As the blade begins to move the pin 91 moves with it, allowing the lever 119 to continue its movement whereby the spring 108 on the plunger-rod 106 is allowed to expand still further and the plunger 107 is forced across the space defined between the bars 2 and 21 into the position shown in dotted lines in Figure 1A. The distant end of the lever 113 is moved forwardly with the collar 109 from the position shown in solid lines in Figure 1 to the position shown in dotted lines in that figure, the free end 118 of the lever 113 moves outwardly and forces the arm 122 to the position shown in dotted lines in Figure 1. The plunger-plate 107 forces and retains the strip of bait against the inner edges of the bars 3 and 21 (Figure 13).

The blade being moved forwardly by the hook pulls forward the chain 60 secured to the pin 93 on the blade thus forcing the chain to unwind and the pulley 58 to rotate and at the same time winding the spring within the pulley.

It will be seen that the greater portion of the blade 85 moves ahead of the pin 92 and the hook, and as it moves forwardly below the bottom of the hopper it shears off a piece of bait, and the hook, as it reaches the end of the plate 76, falls from the plate, and releases the pin 92 and with it the blade. Member 90 remains in the advance position while the bait is being severed but as soon as the pin 92 is freed from the hook it moves back into its normal position in relation to the knife before the blade starts to return to normal position. On the return of the blade to the front of the machine, pin 91 picks up lever 119 wherever it may have stopped. Plunger 107 is thus fully retracted before the next piece of bait falls into place. It is necessary for the plunger 107 to move in and hold the bait in advance of the knife and the plunger must be retracted before the knife uncovers the bottom of the hopper on its return stroke, otherwise the next piece of bait would fall on top of the plunger.

The hook meanwhile pierces the piece of bait (Figure 14) and moves it forwardly into contact with the flap 124 which is forced to pivot forwardly and to one side against the action of spring 129 thus freeing the baited hook of obstruction but at the same time impaling the bait firmly on the hook. The baited hook proceeds out of the machine, and into the water and the baiting operation is repeated over and over again as the hooks enter the machine. In the meantime the flap 124 is forced back to its original position by the spring 129. The blade recoils to its original position under the influence of the spring in the pulley 58, the chain 60 being thus re-wound in the pulley. The blade recoils against the buffer pin 54 and at the same time and as stated above the pin 91 forces the lever 119 and with it the arm 133 back to the positions shown in solid lines in Figure 1, and returns the plunger-plate 107 to the normal position and recompresses the spring 108 on the rod 106.

The foregoing description and accompanying drawings are given by way of illustration only and modification within the scope of the appended claims may be resorted to without departing from the invention. The embodiments of the invention in which an exclusive property or privilege is claimed are defined as follows.

We claim:

1. A baiting machine comprising in combination a base, means mounted on said base defining a straight, continuous passage through the machine, said means being divided longitudinally into two parts one of which is rigidly secured to said base and the other being swingably mounted on the base, one end of said passage defining means being provided with a flaring annular formation; hook-guiding means in said passage, a slidable knife, bait-feeding means, bait-retaining means, hook-engaging means on said knife whereby a fish-hook passing through the machine drags the knife past the bait-feeding means; and spring means to return the knife to its normal position.

2. A machine as claimed in claim 1, comprising in addition, a plurality of automatically-operating levers in combination with said bait-holding means and said knife whereby said bait-holding means operates automatically during operation of said knife.

3. A machine as claimed in claim 2 comprising in addition, hook-engageable means movably mounted on the knife and lever-engaging means movably mounted on the knife in relation to said hook-engageable means such that said bait-holding means is operated in advance of the knife.

4. A nozzle for positioning hooks carried at spaced intervals on a line, comprising in combination a tubular member terminating at one end in a flaring, annular formation, a plurality of depressions and wedge-shaped protuberances formed within said tubular member and being integral therewith and designed to cause rotation of a hook moving forwardly within said nozzle, a pair of spaced, arcuate elements mounted on and secured to the inner wall of said nozzle at one end thereof, said elements partitioning one of said depressions, said arcuate elements together and in cooperation with one of said protuberances forming a plurality of interconnecting hook-guiding channels within said nozzle.

5. A nozzle as claimed in claim 4, wherein said nozzle is divided longitudinally into two parts on a diagonal plane.

6. In a baiting machine for use in baiting fishing lines having hooks secured thereto at spaced intervals including a hook-aligning nozzle, a hook-baiting means and a bait-severing means, said hook-aligning nozzle comprising separate sectional means when in operative position forming the nozzle, means to maintain the sectional means in operative position, said sectional means defining a common line-guide and at least one hook-guide channel for a substantial part of the length of the said sectional means and further means on said sectional means defining a separate guide channel for at least one hook for the remainder of the length of said sectional means situated laterally with respect to the axis of the said sectional means.

7. A baiting machine according to claim 6, the sectional means defining said line- and hook-guiding channels comprising a plurality of longitudinal bars, each having a channel therein, said channels being arcuate in cross-section, one of said bars being superposed on a second of said bars and spaced therefrom to form said hook-guiding channel, a third of said bars being laterally situated with respect to first and second-mentioned bars and having means operable therewith for moving said third-mentioned bar into and out of engagement with said first and second-mentioned bars, whereby said line-guiding channel may be opened and closed.

8. A baiting machine as claimed in claim 7, further characterized in that one of the sectional means is secured to and movable with the movable member of said plurality of bars.

9. A baiting machine as claimed in claim 6, said nozzle comprising in combination a cylindrical wall, means defining a plurality of depressions and wedge-shaped protuberances formed within said wall and designed to cause rotation of a hook moving forwardly within said nozzle, a pair of spaced arcuate elements mounted on and secured to said wall and partitioning one of said depressions, said arcuate elements together and in cooperation with one of said protuberances forming a plurality of interconnecting hook-guiding channels within said nozzle.

10. A baiting machine as claimed in claim 9 comprising in addition, means constituting an inner line-guiding passage located centrally of said nozzle, and an outer hook-traversing passage located laterally of said nozzle and said passages being coextensive and concentric and extending over a portion only of the length of said nozzle, said passages being defined by said arcuate elements in cooperation with the wall of said nozzle.

11. A baiting machine as claimed in claim 10, the said outer passage being tapered at one of its extremities and terminating as a rectangular aperture, said plurality of interconnecting hook-guiding channels being in communication with said outer passage and said inner passage, one of said plurality of hook-guiding channels being in communication with said rectangular aperture, said inner passage and said rectangular aperture being in alignment with and opening into said line-guiding channel and said hook-guiding channel.

12. A baiting machine as claimed in claim 9, an end of each of said arcuate members being tapered forming hook-deflecting means.

13. In a baiting machine for use in baiting fishing lines having hooks secured thereto at spaced intervals including a hook-aligning nozzle, a hook-baiting means and a bait-severing means, said hook-aligning nozzle comprising separate sectional means, one of said sectional means being swingable with respect to the other sectional means whereby a line may be inserted between the sectional means when the swingable sectional means is swung away from the other sectional means, said sectional means when in operative position forming the nozzle, means to maintain the sectional means in operative position, said sectional means defining a common-line guide and at least one hook-guide channel for a substantial part of the length of the said sectional means and further means on said sectional means defining a separate guide channel for at least one hook for the remainder of the length of said sectional means situated laterally with respect to the axis of the said sectional means.

THOMAS HENDERSON McCULLY HOPKINS.
GEORGE BAUERNFEIND.

References Cited in the file of this patent

UNITED STATES PATENTS

| Number | Name | Date |
|---|---|---|
| 2,511,828 | Andrist | June 20, 1950 |
| 2,518,590 | Andrist | Aug. 15, 1950 |